Dec. 29, 1942.　　　　A. R. WILLARD　　　　2,306,922
WIPER MECHANISM
Original Filed Jan. 11, 1939　　　4 Sheets-Sheet 1

INVENTOR.
ALFRED R. WILLARD
BY
Lewis Hudson & Kent
ATTORNEYS

Dec. 29, 1942.   A. R. WILLARD   2,306,922
WIPER MECHANISM
Original Filed Jan. 11, 1939   4 Sheets-Sheet 2

INVENTOR.
ALFRED R. WILLARD
BY   Kwis Hudson & Kent
ATTORNEYS

INVENTOR.
ALFRED R. WILLARD
BY Kwis Hudson & Kent
ATTORNEYS

Dec. 29, 1942.   A. R. WILLARD   2,306,922
WIPER MECHANISM
Original Filed Jan. 11, 1939    4 Sheets-Sheet 4
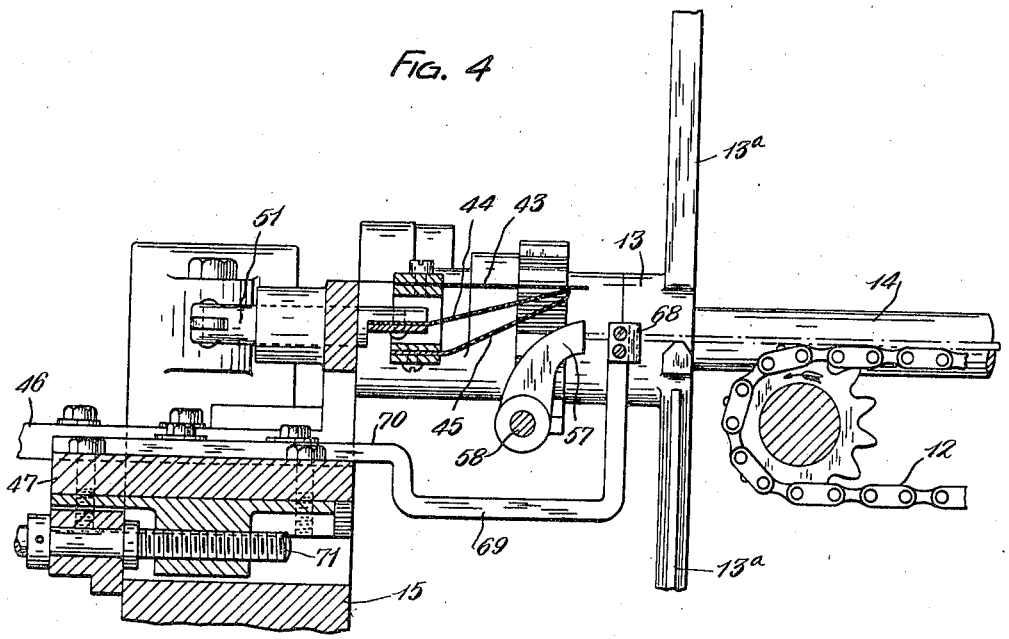
Fig. 4
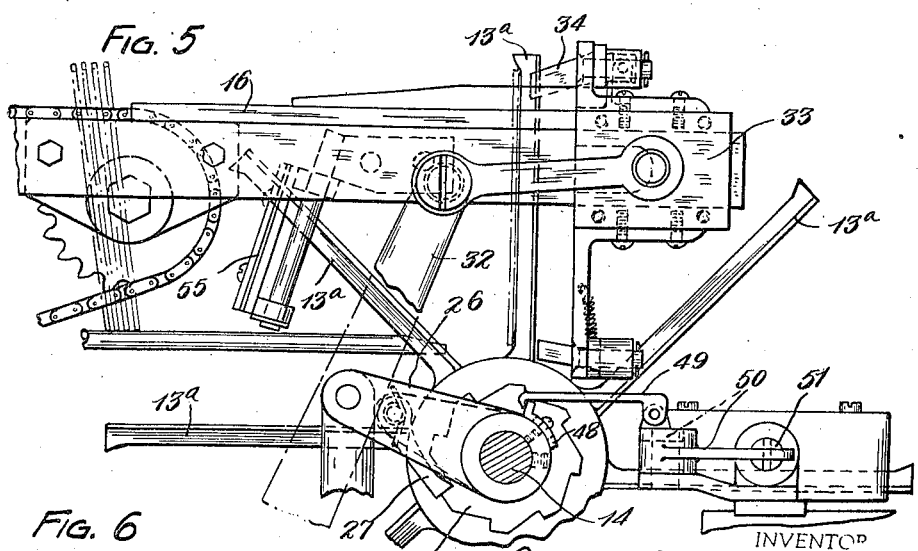
Fig. 5
Fig. 6
INVENTOR
ALFRED R. WILLARD
BY Kwis Hudson & Kent
ATTORNEYS Patented Dec. 29, 1942

2,306,922

UNITED STATES PATENT OFFICE 2,306,922

WIPER MECHANISM

Alfred R. Willard, East Cleveland, Ohio, assignor to Willard Storage Battery Company, Cleveland, Ohio, a corporation of West Virginia Original application January 11, 1939, Serial No. 250,393. Divided and this application October 22, 1941, Serial No. 416,065. In Canada January 4, 1940

9 Claims. (Cl. 15—93)

This invention relates to an improved form of wiper mechanism for wiping off and clearing the edges of articles, such as storage battery plates and like articles of a generally flat nature, when such articles are being conveyed by mechanical feed apparatus utilized in the process of manufacturing such articles.

This application is a division of my application Serial No. 250,393, filed January 11, 1939, for Material handling and conveying mechanism.

The mechanism of my prior application was designed particularly for use in the manufacture of storage battery plates. Generally the lead or lead antimony grids are cast in pairs and are then pasted, i. e., the interstices of the grids are filled with paste by feeding the grids edgewise on a horizontal conveyor through the pasting machine proper. In some instances the grids and generally the double grids move endwise through the pasting machine and sometimes sidewise. In either event, a certain amount of paste adheres to the edges and particularly the leading edges of the grids.

My improved wiper mechanism is designed particularly for use in handling and conveying mechanism which conveys the pasted grids directly from the pasting machine or from a heating and drying chamber which may be used just beyond the pasting machine, and is designed to function to wipe the paste from the leading edges of the grids as the grids are transferred from the horizontal conveyor leading either from the pasting machine or from the heating and drying chamber, in conjunction with mechanism which automatically lifts and transfers the plates from the conveyor to other conveying means leading to a stacker.

The principal object of the invention is to provide a wiper which automatically wipes the leading edges of the plates clear of adhering paste whether dried or in its wet condition as would be the case when the plates leave the pasting machine, together with novel and effective means whereby the wiper blade is automatically cleared of adhering paste after each wiping operation.

The invention may be further briefly summarized as consisting in certain novel details of construction and combinations and arrangements of parts which will be described in the specification and set forth in the appended claims.

In the accompanying sheets of drawings wherein I have illustrated my invention applied to material handling and conveying mechanism including a conveyor for conveying storage battery plates to a so-called take-out member which successively lifts the plates from the conveyor and delivers them to receiving mechanism extending at right angles to the conveyor, Fig. 1 is a plan view of the material handling and conveying mechanism in connection with which my improved wiper mechanism is employed;

Fig. 4 is a sectional view substantially along the line 4—4 of Fig. 3;

Fig. 5 is a fragmentary sectional elevational view showing the wiper blade in a different position with respect to the cleaner blades than illustrated in Fig. 4; and Fig. 6 is an enlarged detail view of part of the take-out mechanism and including the means by which the wiper mechanism is operated.

Figure 1:
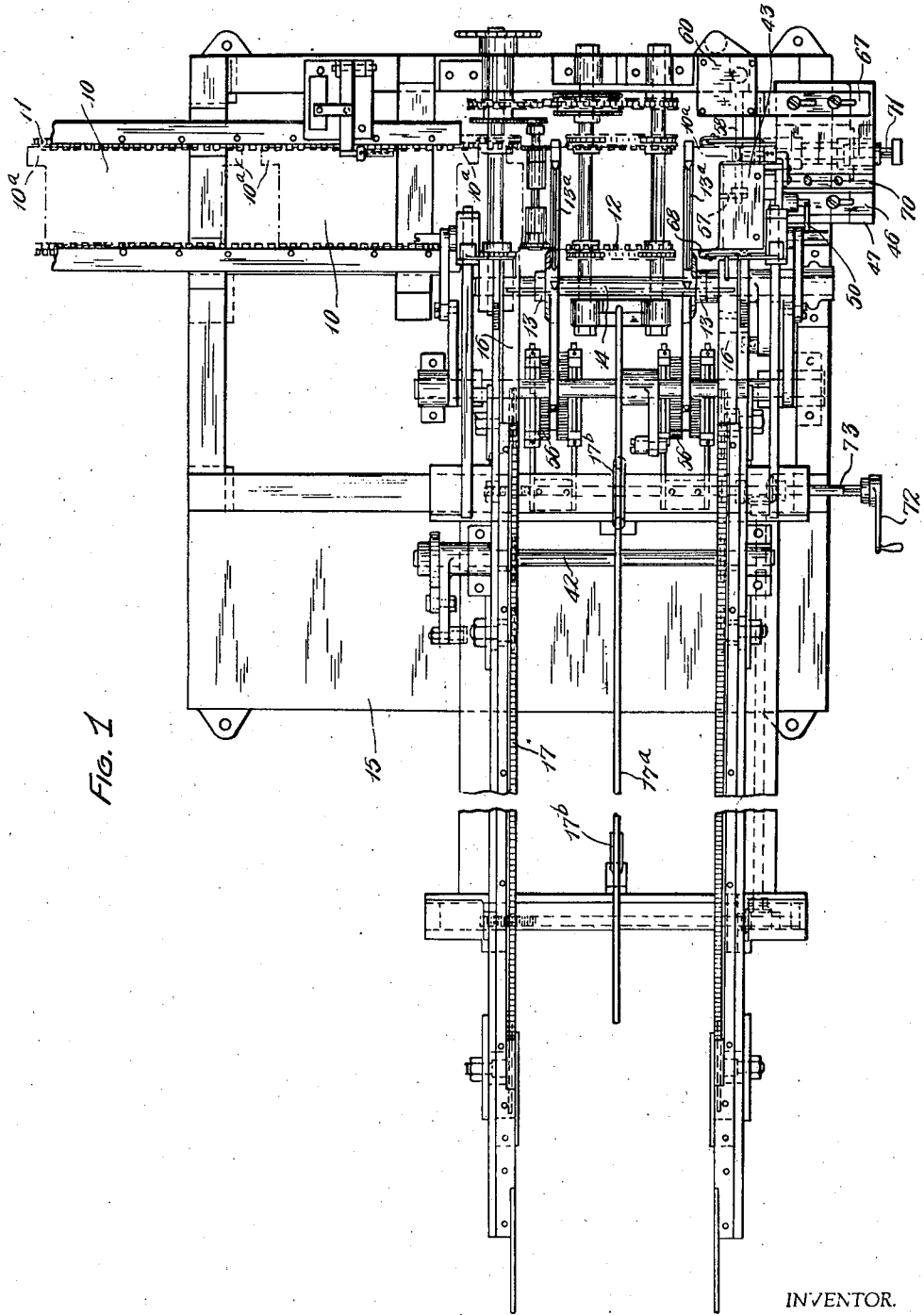

The articles in connection with which the improved wiper mechanism of this application is employed, which in this instance are double storage battery plates 10, are conveyed by a horizontal conveyor 11 to a so-called take-out mechanism which bodily lifts the plates one at a time and delivers them in substantially vertical position onto suitable receiving apparatus which extends at right angles to and is somewhat above the plane of the conveyor 11. It is while the plates are being lifted and turned for delivery onto the receiving apparatus that the edges of the plates are freed of excess paste. My improved wiper mechanism functions to clean or scrape the paste from the leading edge, in this case the forward end, of the double grids. This edge of each of the grids generally carries the major portion of the excess paste since this edge is foremost as the plates are passed through the pasting machine. Of course, in some instances the plates may be passed through the pasting machine sidewise instead of endwise, in which case the wiper mechanism will be useful in removing the paste from the forward side edges of the plates. It might be here stated also that my improved wiper mechanism may be used to advantage in machines which deliver or handle articles other than storage battery plates.

The conveyor for bringing the plates to the transfer mechanism is in two sections including a main section designated 11 and a short auxiliary section 12 which is in line with section 11 and is located at the point where the plates 10 are lifted and swung upwardly toward the receiving mechanism. The two conveyor sections 11 and 12 are driven continuously and at the same speed although other parts including the take-out member and one element of my improved wiper mechanism are operated intermittently.

The take-out member is in the form of a double star wheel 13 with radially disposed arms 13a, this wheel being mounted on a horizontal shaft 14 journaled in bearings carried by a frame 15 which supports all the operating mechanism of the machine with the exception of the remote part of the conveyor 11. This star wheel has two sets of radially disposed arms 13a which swing in vertical planes at opposite ends of the relatively short conveyor section 12. In this instance there are eight arms on each half of the double star wheel and during each cycle of the machine including one of the intermittent operations of the take-out wheel, one pair of arms of the wheel is moved from horizontal position beneath the ends of the plate 10 through an angle of 45°. However, it is obvious that the number of arms of the double star wheel and the extent of arcuate or angular movement of the wheel are immaterial to the present invention. Furthermore, my improved wiper mechanism may be employed with other forms or types of take-out mechanism.

During the next cycle of operations, the star wheel is given another increment of movement which raises and swings through an arc of 45° the succeeding plate on the auxiliary conveyor 12 and at the same time swings the plate which preceded it to vertical position and deposits the same on a pair of horizontal take-out rails 16 located at the top of the machine with the plate extending substantially vertically and with its corner lugs 10a resting on the rails. Intermittently operating pushers slide the plates along the rails onto an intermittently operated take-out conveyor 17 also supported at the top of the frame. Preferably the lower edges of the plates 10 drag along a lower bar or rail 17a (See Figs. 1 and 2) which is held by adjustable supports 17b (Fig. 2) at the desired height midway between the take-out rails and the chains of the take-out conveyor so that the bottom edges of the plates will bear on and drag thereover, with the result that the plates while traveling along the take-out rails and the take-out conveyor are maintained in slightly inclined position. The purpose of this rail 17a is to prevent the plates from swinging as they are delivered onto the take-out rails and then onto the chains of the take-out conveyor, thereby avoiding the likelihood of damage to the plates as would occur if they were permitted to swing into contact with each other.

The specific mechanism for operating the intermittently movable parts and the details of the plate receiving apparatus are not material to the present invention. It will be sufficient to state that a power unit is employed including a motor (not shown) which operates the conveyors 11 and 12 continuously and the other parts intermittently. The various parts of this power unit and the driving connections between it and the conveyors 11 and 12 as well as between it and the intermittently actuated parts are fully described in my application Serial No. 250,393 and therefore they are not fully illustrated and described in the present application as they are not material to the present invention and some of the parts will be referred to only briefly.

Figure 2:
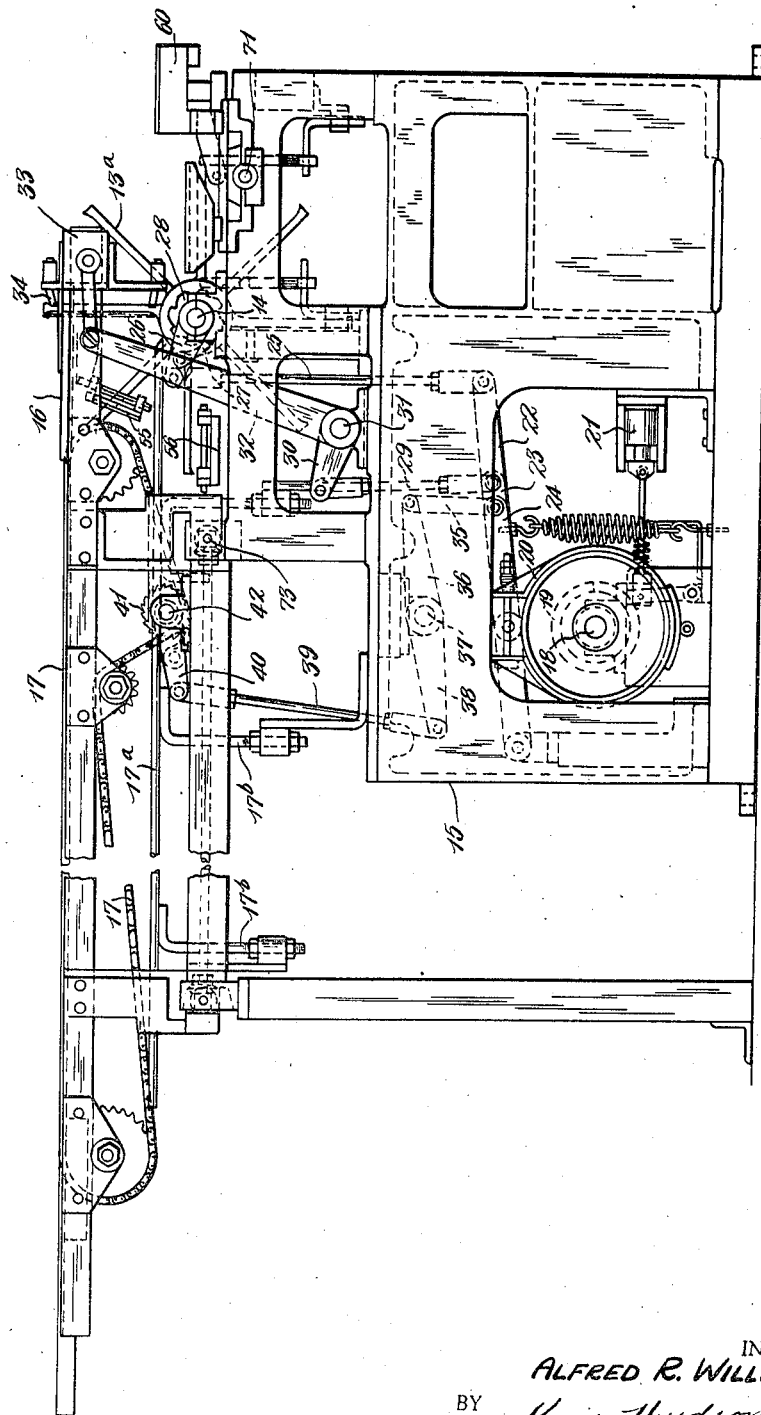
Fig. 2 is an end view of the same.

The motor of the power unit is adapted to drive intermittently a shaft 18 the end of which is shown in Fig. 2, the intermittent movements of this shaft being imparted by the motor through a one-revolution clutch 19 indicated by dotted lines in Fig. 2. This clutch is engaged intermittently and, after making one revolution, is disengaged. A brake 20 shown in Fig. 2 prevents more than one revolution of shaft 18 on each engagement of the clutch. The clutch is caused to be engaged at regular intervals through the intermittent energization of a solenoid 21 which, as will be explained subsequently, is caused to be energized by each plate 10 as it reaches the end of its travel on the conveyor 12.

The shaft 18 through a series of cams (not shown) operates three levers 22, 23, and 24. The lever 22 has connected to its free end a rod 25 the upper end of which is connected to an arm 26 which is mounted to swing about the axis of the shaft 14 which carries the take-out wheel and which carries a pawl 27 which engages a ratchet 28 fixed to the shaft 14. There are as many teeth on the ratchet 28 as there are arms 13a on each half of the star wheel, and thus intermittent movement of the desired extent is given to the star wheel during each cycle of operations.

The lever 23 is connected by a link 29 to an arm 30 on a shaft 31 carrying a pair of arms 32 which at their upper ends are connected to sliding crossheads 33 carrying pusher fingers 34 which at each cycle of operations slide a plate off the rails 16 onto the conveyor 17. The other lever 24 is connected by a link 35 to an arm 36 secured to a rock shaft 37. Secured to one end of this rock shaft is an arm 38 connected by a link 39 to an arm 40 carrying a pawl which is adapted to actuate a ratchet 41 fixed to a cross shaft 42 having a pair of sprockets engaging the chains of the intermittently operated conveyor 17.

I will next describe the parts or elements which are utilized in freeing the edges of the plates 10 of excess paste and one part or element of which is intermittently operated and functions in timed relation with the other intermittently movable parts heretofore described.

The plates pass through the pasting machine in end to end relation in the same manner that they are positioned on the conveyors 11 and 12, and, in consequence, as before stated, the leading edge of each plate generally carries the major portion of the excess paste adhering to the edges of the plate. To remove the excess paste I provide a wiper blade (see Figs. 4 and 5) which is flexible and which together with the blades associated with it is made of non-corrosive metal. This wiper blade is positioned in a substantially horizontal plane just above the plate 10 when it comes to a stop on the secondary or auxiliary conveyor 12 so that as the arms of the take-out wheel swing the plate 10 upwardly the forward edge of the wiper blade 43 will engage the forward edge of the plate 10 and wipe the paste from it.

As the paste tends to collect on the wiper blade, I provide beneath the latter a reciprocating cleaner blade 44 which during each cycle of the machine is projected forwardly across the lower surface of the forward portion of the wiper blade 43 so as to scrape the paste from its forward edge after each wiping operation by the blade 43. This cleaner blade 44 is projected forwardly from the position shown in Fig. 4 to the position shown in Fig. 5 to effect the cleaning operation and is then retracted again to the position shown in Fig. 4, and as it is retracted the paste is wiped from it by a stationary cleaner blade 45 which is located beneath it and constantly engages its lower surface. The stationary blades 43 and 45 are mounted upon a support 46 which is adjustably secured to a supporting plate 47 (see Figs. 3 and 4) in turn adjustably mounted on the main frame 15.

To reciprocate the cleaner blade 44 I provide on the hub of the arm 26 carrying the pawl which actuates the take-out wheel a plate 48 with an upstanding lip (see Fig. 6) and hooked over and engaging behind the lip of this plate is a downturned flange of a link 49 which is connected to one arm of a bell crank 50 (Figs. 3 and 6) mounted to turn on a vertical axis, the other arm of the bell crank being connected by a link 51 (see Figs. 3 and 4) to the rear portion of the cleaner blade 44. The bell crank 50 is journaled in an extension of the supporting member 46 which carries the two stationary blades 43 and 45.

With this mechanism, when the arm 26 is swung downwardly (see Fig. 6) so as to cause its pawl 27 to turn the ratchet 28 and therefore the take-out wheel, the cleaner blade 44 is projected forwardly beyond the forward edge of the wiper blade 43. As the plate 10 is swung upwardly, the forward edge portion of the wiper blade 43 wipes the paste from the edge of the plate as pointed out above, and this occurs just before the cleaner blade 44 is projected forwardly beyond the forward edge of the wiper blade 43. On the return movement of the arm 26 the blade 44 and the mechanism for actuating it are retracted by a spring 52 (Fig. 3) one end of which is connected to the bell crank 50 and the other to a stationary point. With this mechanism the forward edge portions of the wiper blade 43 and of the cleaner blade 44 are freed of paste.

I prefer also to wipe the paste from the forward edge of the forward lug 10a of each plate 10, and for this purpose I provide a stationary flexible wiper blade 53 (Fig. 3) whose forward edge wipes the paste from the edge of the lug 10a when the plate 10 is swung upwardly by the take-out mechanism, this occurring at the same time that the wiper blade 43 functions. The stationary wiper blade 53 is mounted on an arm 54 carried by an arm projecting from the supporting member 46. Obviously when the supporting member 46 is adjusted it adjusts the positions of the blades 43, 44, and 45 and of the bell crank 50 as well as the position of the wiper blade 53 which engages the edge of the lug 10a, as stated above.

It might be here stated that the upright edges of the plates 10 are also cleared of excess paste as they are moved along the take-out rails 16 by flexible stationary wiper blades 55 (see Figs. 2 and 6) suitably supported on the rear portions of the rails 16. The arms of the take-out wheel are freed of paste which tends to cling thereto by being caused to swing between wipers or brushes 56 (see Fig. 1) suitably supported by the frame 15 of the machine. Additionally, if desired, the chains of the main conveyor may be cleared of paste by having the lower runs thereof pass over paste removing brushes not herein shown.

Thus it will be seen that during each cycle of the take-out mechanism, upon the energization of the solenoid 21 the plate 10 on the take-out rails is pushed forward, the take-out wheel is rotated one-eighth revolution, the chains of the take-out conveyor are actuated, and the cleaner blade 44 is reciprocated, all as explained above. These operations are performed quickly and more or less simultaneously, it being essential only that the pusher fingers start quickly enough to prevent the downwardly extending arms of the take-out wheel from striking the plate on the take-out rails. That the series of operations occurs quickly will be readily appreciated when consideration is given to the fact that a machine constructed in accordance with this application functions very effectively with the plates being conveyed at the rate of sixty-one or more plates per minute and with the moving plates on the conveyor spaced generally three or four inches apart. However, a higher speed of operation may be attained. As a matter of fact, the parts of the take-out mechanism are timed and operated at a speed such as to accommodate seventy-one plates per minute. This speed of the take-out mechanism is maintained even though less than seventy-one plates per minute are delivered by the conveyor chains 11 and 12.

The energization of the solenoid 21 and the initiation of the cycle of operations are controlled by the plates themselves, as already stated. To accomplish this I provide at a suitable distance in front of the secondary conveyor 12 a contact finger 57, see particularly Figs. 3 and 4, mounted upon an inwardly extending horizontal arm 58 pivoted to turn on a vertical stud 59 journaled in a switch box 60 containing a switch 61 of standard construction. The finger 57 is engaged by the forward edge of the plate 10 in the manner indicated in Fig. 3 and in so doing the plate pushes the finger rearwardly and swings the arm 58 until it engages an adjustable stop 62 shown by dotted lines in Fig. 3, this adjustable stop being carried by an arm 63 extending inwardly from the switch box 60. The engagement of the arm 58 with the stop 62 stops the movement of the plate 10 on the secondary conveyor 12 and the swinging movement thus imparted to the arm 58 actuates the switch 61 by moving a switch actuating member 64 away from a cooperating actuating member of the switch 61. The actuating member 64 is carried by an arm 65 secured to the upper end of stud 59, as clearly shown in Fig. 3. This immediately starts the cycle of operations explained above, and as the plate 10 is lifted by the take-out wheel, the arm 58 and the contact finger 57 are returned to normal position (shown in Fig. 3) by a spring 66, and, meanwhile, the next succeeding plate 10 is rapidly moved underneath the plate 10 being lifted by the take-out wheel and the operation is thereupon repeated.

Figure 3:
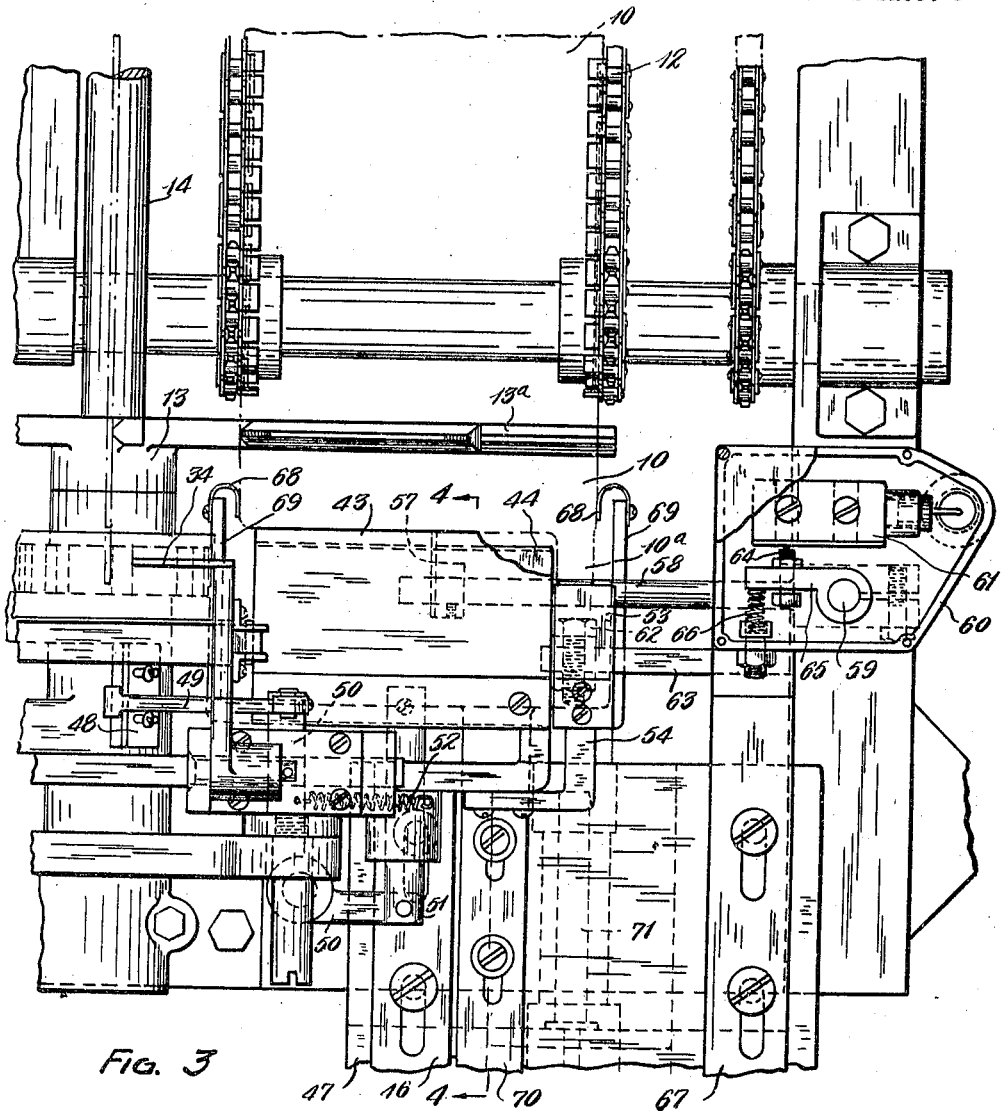
Fig. 3 is a top plan view on an enlarged scale of a portion of the take-out mechanism.

The switch box 60 and the timing mechanism associated with it, including the arm 58 and the arm 63 carrying the adjustable stop 62, are carried by an adjustable member 67 secured to the adjustable support 47 (see particularly Fig. 3).

Inasmuch as the plates 10 travel at high speed on the conveyors 11 and 12, it is desirable that the speed of each plate be checked somewhat just before it engages the finger 57. I accomplish this by causing the side edges of the plates 10 just before they reach the end of their travel and just before they contact with the finger 57 to frictionally engage brake shoes 68 which are preferably formed from flexible metal. Only the forward portions of the side edges of the plates engage these brake shoes, as clearly shown in Fig. 3. In this manner the movement of the plates is slowed down sufficiently that they engage the finger 57 while traveling at such speed that there is no danger of an undesirable blow being imparted by the plates 10 to the timing or solenoid-controlling mechanism. The brake shoes 68 are in this instance carried by the arms 69 of a fork which is attached to a supporting member 70 adjustably secured to the support 47.

Occasionally it is desired to run through the machine quantities of plates of different lengths. Provision is made in the machine disclosed herein for taking care of a situation of this kind. When plates of a different length than those for which the machine is set are to be run through, the positions of the contact mechanism, the plate retarding means, and the wiper mechanism at the end of the machine where the travel of the plates is stopped on the secondary or auxiliary conveyor are changed. These mechanisms can be adjusted by loosening a series of set-screws which secure the support 47 to the frame 15 and applying a crank to the end of an adjusting shaft 71 (see Figs. 1 and 4).

Since the plates are supported by their corner lugs on the take-out rails 16 and on the chains of the take-out conveyor 17, it is necessary also that the distance between these rails and between the chains of the take-out conveyor 17 be adjusted when the length of the plates 10 is changed. This can be readily done by a crank 72 (Fig. 1) which is adapted to be applied to a shaft 73 which operates mechanism for moving toward or away from each other the rails which support the chains of the take-out conveyor 17.

Of course, the contact mechanism, i. e., the mechanism for controlling intermittently the energization of the solenoid, can be independently adjusted by adjusting the supporting member 67. The same is true of the wiper blade 43 and the cleaner blades 44 and 45 and of the brake shoes 68 since the supports 46 and 70 carrying these parts can be independently adjusted.

It is believed that the operation of the various parts of the machine will be understood from the foregoing description without a further connected description of the mode and sequence of operation.

While I have shown the preferred construction, I do not desire to be confined to the precise details illustrated and described but aim in my claims to cover all modifications which do not involve a departure from the spirit and scope of the invention. Furthermore, I do not desire that the invention be limited to a construction wherein storage battery plates are conveyed along the main and auxiliary conveyors and handled by the take-out mechanism for the parts constituting the subject matter of the present invention have utility in cleaning the edges of articles other than storage battery plates.

Having thus described my invention, I claim:

1. In conveying apparatus, a conveyor for conveying articles, a take-out mechanism for lifting the articles from the conveyor, and means for cleaning the front edges of the articles as they are lifted by the take-out mechanism, said means comprising a pair of relatively movable blades, one for engaging edges of the articles and the other for engaging and cleaning the first named.

2. In combination with a machine having a conveyor for conveying articles along a given path and take-out mechanism for transferring the articles from the conveyor to receiving means, a wiper mechanism for cleaning edges of the articles as they are being transferred by the take-out mechanism to the receiving means, said wiper mechanism including a blade for engaging edges of the articles and a second blade for engaging and cleaning the edge portion of the first-named blade, and means for moving said blades relatively in predetermined timed relation to the operation of the take-out mechanism.

3. A wiper mechanism for cleaning edges of articles as they are being moved by conveying means comprising a plurality of blades including a wiper blade for wiping edges of the articles, a relatively movable cleaner blade for engaging the edge portion of the wiper blade to clean it, and a second cleaner blade for engaging the edge portion of the first cleaner blade to clean it.

4. A wiper mechanism for cleaning edges of articles as they are being moved by conveying means comprising a plurality of blades including a fixed wiper blade for cleaning edges of the articles, a fixed cleaner blade, and a second cleaner blade movable between said first two blades and adapted to engage the edge portions thereof.

5. In combination with a conveyor for conveying articles along a given path, an intermittently movable take-out mechanism for transferring the articles from the conveyor to article receiving means, a wiper mechanism including two relatively movable blades one stationary and the other intermittently operated, one of said blades being adapted to wipe edges of the articles as they are being carried by the take-out mechanism and the other engaging and serving to clean the edge portion of the wiper blade.

6. In combination with a conveyor for conveying articles along a given path and take-out mechanism for transferring the articles to receiving means, a wiper mechanism for cleaning edges of the articles as they are being moved by the take-out mechanism including two blades one fixed and the other movable relative thereto, one a wiper blade serving to wipe edges of the articles and the other a cleaner blade serving to clean the edge portion of the wiper blade, and means for operating the take-out mechanism and said movable blade intermittently.

7. In combination with a conveyor for conveying articles along a given path and take-out mechanism for transferring the articles to receiving means, a wiper mechanism for cleaning edges of the articles as they are being moved by the take-out mechanism including a fixed wiper blade for engaging edges of the articles while being moved by the take-out mechanism, a reciprocable cleaner blade for engaging the under surface of the edge portion of the wiper blade, and a fixed cleaner blade for engaging the under surface of the edge portion of the reciprocable cleaner blade, and means for substantially simultaneously and intermittently actuating the take-out mechanism and the reciprocable cleaner blade.

8. In combination with a machine having a conveyor for conveying articles along a given path in substantially horizontal position, receiving means for supporting the articles in substantially vertical position, take-out mechanism for transferring the articles from the conveyor to the receiving means and during this operation swinging the articles through an angle of substantially 90°, and wiper mechanism for cleaning edges of the articles while the transfer mechanism swings the articles from the conveyor to the receiving means.

9. In combination with a machine having a conveyor for conveying articles along a given path in substantially horizontal position, receiving means for supporting the articles in substantially vertical position, take-out mechanism for transferring the articles from the conveyor to the receiving means and during this operation swinging the articles through an angle of substantially 90°, wiper mechanism for cleaning edges of the articles while the transfer mechanism swings the articles from the conveyor to the receiving means, said wiper mechanism including a pair of relatively movable blades one adapted to engage the edges of the articles, and means for intermittently operating the take-out mechanism and for relatively moving said blades.

ALFRED R. WILLARD.